Feb. 28, 1967     G. R. BUERGER     3,306,311
FOOD STORAGE MEANS
Filed Dec. 1, 1964
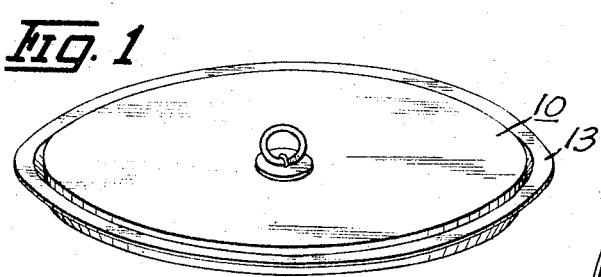
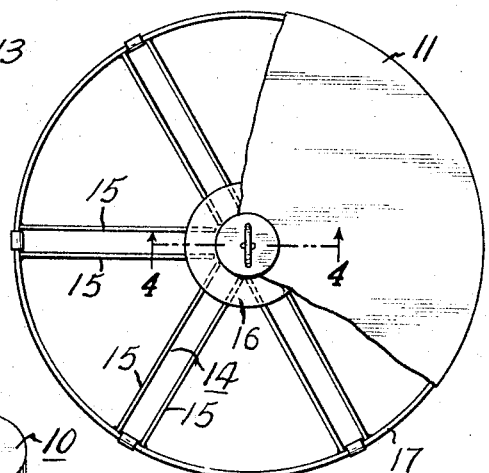
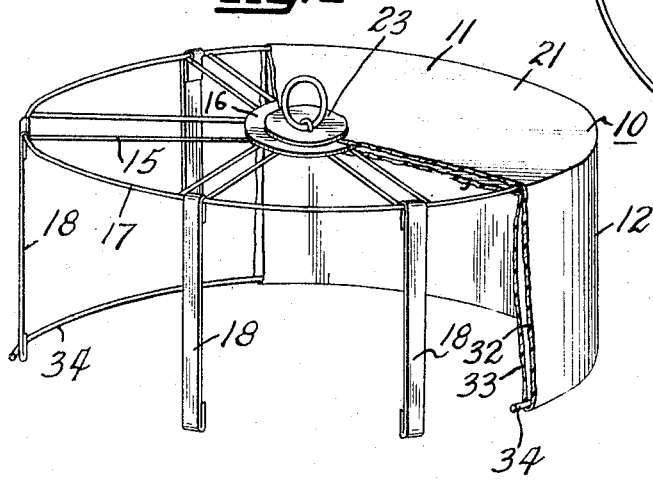
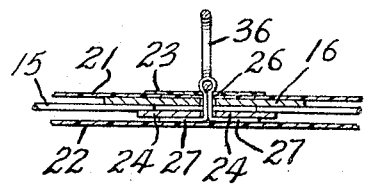
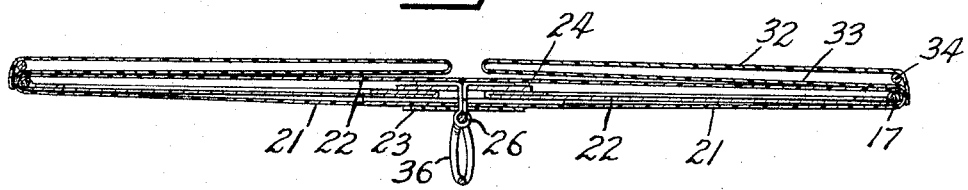
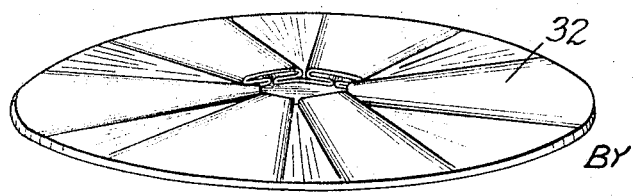
INVENTOR.
GEORGE R. BUERGER
BY Corey & Corey
ATTORNEYS.

United States Patent Office 3,306,311
Patented Feb. 28, 1967

3,306,311
FOOD STORAGE MEANS
George R. Buerger, 721 N. 75th St.,
Omaha, Nebr. 68114
Filed Dec. 1, 1964, Ser. No. 415,099
4 Claims. (Cl. 135—5)

This invention relates to food storage means and has particular relation to collapsible and portable food covers, particularly adapted to be used for covering food stuffs such as cakes and the like.

Collapsible food covers have been proposed and these covers utilize various wedges, formers, over-center toggles and the like to provide for collapsing the cover. Such structures are complicated and expensive.

One of the main objects of my invention is to provide a cover in which the above wedging and separating means are not necessary and may be dispensed with, and in which opening and closing of the cover may be secured merely by shaking it from one suspended position to open it, and turning it upside down and again shaking it to close it. The invention dispenses with any levers or wedges or like mechanisms for holding the cover in the extended position or for retracting it, and also dispenses with any mechanical means other than the shaking operation above referred to for extending or collapsing the cover, yet causing the cover to stay open and stand on its own frame in the opened position.

Other objects of the invention are to provide an inexpensive, simple, and attractive cover, light in weight and which affords adequate protection for the food stuffs while in the extended position, and which may be readily closed and stored away while not in use.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

FIGURE 1 is a view in perspective of a cover constructed in accordance with a preferred embodiment of my invention as it appears when collapsed and nested into a cake pan which is used for supporting the cake.

FIGURE 2 is a view in perspective of the framework of the cover constructed according to my invention, with portions of the cover removed and framework removed for better illustration.

FIGURE 3 is a top plan view of the upper framework of the cover with the cover removed from a portion thereof.

FIGURE 4 is a partial view in section, taken along the lines 4—4 of FIGURE 3.

FIGURE 5 is a view in section of the cover as it appears upside down in a collapsed position, and FIGURE 6 is a view in perspective of the underside of the cover as it appears in the collapsed position and illustrates how the guides and sides fold over.

Referring now to the drawings, and particularly to FIGURES 1, 2 and 3, a cover constructed according to a preferred embodiment of my invention includes the disc-like upper framework member having a cover of plastic or the like stretched over the framework, as illustrated in FIGURES 2 and 3.

A cover 10 constructed according to one embodiment of my invention may be considered as of two portions, one a disc-like cover member 11, and the other a retractable skirt 12 depending from the outer periphery of the disc. The skirt may be extended to a cylindrical form to support the disc-like cover above the cake or other food stuff, and also to afford a side cover; or it may be folded inwardly and up underneath the disc-like cover. It is shown in the collapsed condition in FIGURE 1 and nested in the cake pan 13.

The upper disc-like portion of the cover has a framework including spokes 14, at the present time some 6 in number, these spokes consisting of parallel wires 15 as illustrated in FIGURES 2 and 3, and the wires are secured to the underside of a washer-like disc 16 by means of welding or the like. The outer ends of each of the wires 15 are joined as by welding to a ring 17 which forms the outer periphery of the disc-like upper portion. The wires, as they extend in parallel position, define and limit the movement of straps, legs, struts or stiffeners 18 and prevent them from moving along the ring 16, except in rotation about the ring 16 as a pivot. In the collapsed position, the struts or legs are at least partially received between the wires 15.

The disc-like framework formed by the center disc 16, the wires 15 and ring 17 is preferably covered by plastic or fabric or other pliable, flexible material, formed or cut and fitted and secured to form a two-part envelope around the framework and, as illustrated, the cover is formed in this way to provide what may be termed an outside plastic cover or envelope wall 21 and inside plastic cover or wall 22 (see FIGURE 4). The outer plastic wall 21 extends over the center disc 16. A clamping washer 23 is located on the upper side of the plastic cover 21 and a second clamping washer 24 is located just below the wires 15.

The members 23, 21, 16 and 24 are all provided with openings therethrough and a bifurcated clamping pin member 26, much like a cotter pin, is passed downwardly through these openings and the legs spread, as indicated at 27, to hold the assembly together. A supporting ring 36 is passed through the loop 29 of the clamping pin, which ring serves as a handle to be grasped and shaken to secure opening of the cover.

The side portion of the cover or skirt, indicated generally at 12, is plastic or fabric or other pliable or flexible material formed to provide an outer wall 32 and inner wall 33 to thus constitute an enclosure secured to the ring 17 at its upper end and having struts 18 free to float within the cylindrical pocket formed by the outer wall 32 and the inner wall 33. A second or operating ring 34 is enclosed within the inner and outer walls which form the skirt 31, and this ring is free to float within the enclosure. It is not connected to the struts or legs 18. The legs 18 are preferably of light strap material folded over at the ends to prevent tearing of the cover, but these members may be of wire or plastic or the like if desired. There is no connection nor latching of the lower ends of the struts 18 to the ring 34, except that afforded by pressure of the fabric or plastic cover. The ring 34 may be the same or less diameter than the ring 17 so as to readily nest with it when the cover is in the retracted or closed position.

In operation, when it is desired to extend and open the cover, the ring or handle 36 is grasped and the cover is shaken until the operating ring 34 drops down within the envelope formed by the wall of the skirt and to the bottom of this cylindrical envelope. The legs or struts 18 also drop and the skirt 13 is fully extended to form a cylinder-like side wall which will not collapse until the ring 34 is again retracted. The operating ring 34 holds the cover in the expanded, open position, with the ring in the lower position holding the lower portion of the skirt in extended position. The legs will bear the weight of the upper portion of the cover and the sides of the cover, and the cover will not collapse.

When it is desired to close the cover for storage, all that is necessary to do is turn the cover upside down and shake it and the ring 34 will drop to its position adjacent the ring 17 and, relieved of the extending action of the ring, the skirt will collapse to the position shown in FIGURES 5 and 6, with the struts also retracted to a position against or adjacent the spokes 13 of the upper portion of the cover.

The unique combination of the cylindrical or skirt portion of the cover, the legs, and the free floating ring interacting as has been explained, not only cause the cover to open by gravity and to remain in the open position, meanwhile resting on its legs and resting on the ring 34, but reversal of the cover to the upside down position and shaking it will cause retraction of all of the elements, including the ring 34, legs 18 and the cylindrical or skirt portion 12 of the cover, causing it to almost automatically close to closed position, the only action necessary being that of adding a bit to the gravity effect by shaking the cover to thus cause an increased combination of gravity and jarring action to cause retraction of the ring, legs and skirt. The cover in its closed position occupies a minimum of space and may be readily stored, as in the cake pan 13 as shown in FIGURE 1, for almost dust-proof storage.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a cover of the class described, a disc-like member and a skirt depending from the periphery of the disc, the skirt including a double-walled envelope, a freely floating ring in the envelope, and legs having pivotal connection with the edge of the disc-like member and enclosed within the double-walled envelope of the skirt.

2. In a food cover, a cylindrical-like member including double side walls to form a pocket, and a free floating ring and stiffener members encased in the side walls for pivotal movement of the legs and up and down movement within the side wall envelope of the ring.

3. In a food cover, a disc to form the horizontal portion of the cover, a skirt-like member depending from the edge of the disc, a freely floating ring encased in the skirt, the ring having substantially the same diameter as the disc and extending around the circumference of the skirt, and stiffeners having swinging engagement with the edge of the disc.

4. In a food cover, a horizontal covering member, stiffeners having swinging engagement with the edge of the covering member to retract by rotation against it and extend at right angles to it, a skirt depending from the periphery of the covering member and engaged to the lower ends of the stiffeners, and a member of approximately the shape of the periphery of the covering member having sliding engagement with and movement along the stiffeners.

References Cited by the Examiner

UNITED STATES PATENTS

| | | | |
|---|---|---|---|
| 1,375,397 | 4/1921 | Lawrence | 312—31.02 |
| 2,405,627 | 8/1946 | Williams | 150—49 |
| 3,133,550 | 5/1964 | Brown | 135—5 |

FRANKLIN T. GARRETT, *Primary Examiner.*